(12) United States Patent
Su et al.

(10) Patent No.: US 8,665,612 B2
(45) Date of Patent: Mar. 4, 2014

(54) CONSTANT CURRENT CONTROLLER

(75) Inventors: Wei-Chuan Su, Taipei (TW); Wei-Chun Hsiao, Taipei (TW)

(73) Assignee: Immense Advance Technology Corporation, Taipei (TW)

( * ) Notice: Subject to any disclaimer, the term of this patent is extended or adjusted under 35 U.S.C. 154(b) by 37 days.

(21) Appl. No.: 13/545,420

(22) Filed: Jul. 10, 2012

(65) Prior Publication Data

US 2014/0016366 A1   Jan. 16, 2014

(51) Int. Cl.
*H02M 3/335* (2006.01)

(52) U.S. Cl.
USPC ..................... 363/21.01; 363/21.12

(58) Field of Classification Search
USPC ......... 363/20, 21.01, 21.12, 21.13, 56.01, 95, 363/97, 131
See application file for complete search history.

(56) References Cited

U.S. PATENT DOCUMENTS

| | | | |
|---|---|---|---|
| 7,443,700 B2 * | 10/2008 | Yan et al. | 363/21.01 |
| 7,505,287 B1 * | 3/2009 | Kesterson | 363/21.01 |
| 8,253,507 B2 * | 8/2012 | Tang et al. | 332/109 |
| 8,422,253 B2 * | 4/2013 | Chang et al. | 363/21.18 |
| 8,456,875 B2 * | 6/2013 | Li et al. | 363/65 |
| 8,482,268 B2 * | 7/2013 | Yang et al. | 323/283 |
| 2011/0109398 A1 * | 5/2011 | Tang et al. | 332/110 |
| 2012/0230064 A1 * | 9/2012 | Yang et al. | 363/21.15 |

\* cited by examiner

*Primary Examiner* — Adolf Berhane
(74) *Attorney, Agent, or Firm* — The Weintraub Group, Inc.

(57) ABSTRACT

A constant current controller for a constant current power module, including: a demagnetization sensing unit, used for detecting the voltage variation of a detection signal to generate a discharging time signal having an active period corresponding to a secondary side discharging time, wherein the detection signal is derived from an auxiliary coil; a secondary side current sensing unit, used for detecting a peak value of a current sensing signal, and providing an output current according to the peak value of the current sensing signal under the control of the discharging time signal, wherein the current sensing signal is corresponding to a primary side current; and an error current generator, used for generating an error current according to the difference between the output current and a reference current, wherein the error current is converted to a threshold voltage by a first capacitor.

9 Claims, 9 Drawing Sheets

CONSTANT CURRENT CONTROLLER

BACKGROUND OF THE INVENTION

1. Field of the Invention

The present invention relates to a constant current controller, especially to a constant current controller for constant current power modules.

2. Description of the Related Art

FIG. 1 illustrates a circuit diagram of a prior art constant current power module. As illustrated in FIG. 1, the prior art constant current power module includes a transformer 10, an NMOS transistor 20, a resistor 30, a controller 40, a diode 51, a capacitor 52, resistors 53, 54, capacitors 55, 56, a resistor 57, a diode 60, a capacitor 70, and a load 80.

The transformer 10 has a primary coil of $N_P$ turns, a secondary coil of $N_S$ turns, and an auxiliary coil of $N_A$ turns.

The NMOS transistor 20 is used for controlling a primary side current $I_P$ flowing through the primary coil according to a duty ratio of a gate signal $V_G$.

The resistor 30, connected between the NMOS transistor 20 and a ground, is used for generating a current sensing signal $V_{CS}$ in response to the primary side current $I_P$.

The controller 40 is used for generating the gate signal $V_G$ in response to the current sensing signal $V_{CS}$ and a detection signal $V_{DET}$.

The diode 51 and the capacitor 52, connected between the auxiliary coil and the ground, are used to regulate an auxiliary signal $V_{AUX}$ from the auxiliary coil to generate a supply voltage for the controller 40.

The resistors 53, 54 are used to divide the voltage of the auxiliary signal $V_{AUX}$ to generate the detection signal $V_{DET}$.

The capacitor 55, connected between a COMV pin of the controller 40 and the ground, is used for the frequency compensation of an error voltage amplification.

The capacitor 56, connected between a COMI pin of the controller 40 and the ground, is used for the frequency compensation of an error current amplification.

The resistor 57, connected between a COMR pin of the controller 40 and the ground, is used for cable loss compensation.

The diode 60 is used for releasing the magnetic energy of the transformer 10 in a form of a secondary side current $I_S$ when the NMOS transistor 20 is off.

The capacitor 70 is used for filtering the secondary side current $I_S$ to provide a regulated output current $I_O$ or regulated output voltage $V_O$ for the load 80.

A detailed function block diagram of the controller 40 is illustrated in FIG. 2. As illustrated in FIG. 2, the controller 40 has a V-LOOP unit 41 for detecting the voltage variation of the detection signal $V_{DET}$ to generate a discharging time signal $S_{DS}$; an I-LOOP unit 42 for detecting a peak value of the current sensing signal $V_{CS}$ and providing an output voltage $V_W$ representing the peak value; a filter unit 43 for generating a filtered voltage $V_I$ according to $V_W$ and the discharging time signal $S_{DS}$; and an amplifier 44 for amplifying the difference between a reference voltage $V_{REF2}$ and the filtered voltage $V_I$.

FIG. 3 illustrates a waveform diagram for the primary side current $I_P$, the current sensing signal $V_{CS}$, the secondary side current $I_S$, the detection signal $V_{DET}$, and the discharging time signal $S_{US}$, wherein the primary side current $I_P$ has a peak value $I_{P-PEAK}$ and a cycle period $T_S$; the current sensing signal $V_{CS}$ has a peak value represented by $V_W$; the secondary side current $I_S$ has a peak value $I_{S-PEAK}$ and a cycle-averaged value $I_{S-cycle}$; and the detection signal $V_{DET}$ has a low-level period $T_{ON}$ representing a primary side charging time, and a high-level period $T_{DIS}$ representing a secondary side discharging time.

A circuit diagram of the I-LOOP unit 42 is illustrated in FIG. 4. As illustrated in FIG. 4, the I-LOOP unit 42 includes a comparator 421, a current source 422, switches 423-425, and capacitors 426-427.

The comparator 421 has a positive input connected to the current sensing signal $V_{CS}$, a negative input connected to the capacitor 426, and an output connected to the switch 423. When the voltage of the current sensing signal $V_{CS}$ is higher than that over the capacitor 426, the comparator 421 will output a high level to switch on the switch 423 so that the capacitor 426 is charged by the current source 422. When the voltage of the current sensing signal $V_{CS}$ is lower than that over the capacitor 426, the comparator 421 will output a low level to switch off the switch 423 so that a peak value of the current sensing signal $V_{CS}$ is stored on the capacitor 426. The charge on the capacitor 426 is than redistributed over the capacitor 426 and the capacitor 427 by a control signal PLS to provide the output voltage $V_W$. A control signal CLR is then used to discharge the capacitor 426.

A circuit diagram of the filter unit 43 is illustrated in FIG. 5. As illustrated in FIG. 5, the filter unit 43 includes an amplifier 430, an NMOS transistor 431, PMOS transistors 432-433, a resistor 434, switches 435-437, and capacitors 438-439.

The amplifier 430 has a positive input connected to the output voltage $V_W$, a negative input connected to the resistor 434, and an output connected to the NMOS transistor 431. Due to a virtual short between the positive input and the negative input of the amplifier 430, the voltage across the resistor 434 will be approaching $V_W$, and a current $I_{432}$ equal to ($V_W$/the resistance of the resistor 434) will be generated accordingly. The PMOS transistors 432-433 act as a current mirror to generate a current $I_{PRG}$ according to $I_{432}$. The switch 435 is switched on by the discharging time signal $S_{DS}$ for a time equal to $T_{DIS}$ to charge the capacitor 438 with the current $I_{PRG}$. The charge on the capacitor 438 is than redistributed over the capacitor 438 and the capacitor 439 by the control signal PLS to provide the filtered voltage $V_I$. The control signal CLR is then used to discharge the capacitor 438.

Based on the foregoing descriptions, the principle of controlling the DC output current $I_O$ of the circuit in FIG. 1 is further explained as follows:

When the circuit of FIG. 1 is operating in DCM (discontinuous conduction mode), the peak value $I_{S-PEAK}$ of the secondary side current $I_S$ can be expressed as:

$$I_{S-PEAK}=(N_P/N_S)\times I_{P-PEAK}.$$

As can be seen in FIG. 3, the secondary side current $I_S$ is of a triangle waveform, therefore, its cycle-averaged value $I_{S-Cycle}$ can be expressed as:

$$I_{S-Cycle}=I_{S-PEAK}\times(T_{DIS}/2T_S)=(N_P/N_S)\times I_{P-PEAK}\times(T_{DIS}/2T_S).$$

Both $N_P$ and $N_S$ are constant values. As the controller 40 of FIG. 1 adopts a fixed-frequency control mechanism, therefore, $T_S$ is also a constant value. The cycle-averaged value $I_{S-cycle}$ is then dependent on $I_{P-PEAK}\times T_{DIS}$. $I_{P-PEAK}$ can be represented by $V_W$/(the resistance of the resistor 30), and $T_{DIS}$ can be represented by the high level period of $S_{DS}$.

By virtue of a virtual short between the positive input and negative input of the amplifier 44, $V_I$ will be regulated at the reference voltage $V_{REF2}$, and the cycle-averaged value $I_{S-Cycle}$ will be held at a constant value. The expressions are as follows:

$V_f$=average of $(I_{PRG} \times T_{DIS})$/the capacitance of the capacitor 438=average of $((V_W/$the resistance of the resistor 434$)\times T_{DIS})$/the capacitance of the capacitor 438=$V_{REF2}$, and $I_{S\text{-}Cycle}$=$(N_P/N_S)\times$average of $(I_{P\text{-}PEAK}\times T_{DIS})/2T_S$=$(N_P/N_S)\times$average of $(V_W/($the resistance of the resistor 30$)\times T_{DIS})/2T_S$=$(NP/NS)\times(V_{REF2}\times$the resistance of the resistor 434$\times$the capacitance of the capacitor 438$)/(2\times$the resistance of the resistor 30$\times T_S)$.

In practical applications, the resistance of the resistor 434 and the capacitance of the capacitor 438 will have variations due to manufacturing processes. With an OSC unit (shown in FIG. 2) using same circuit architecture of FIG. 5 for determining $T_S$, the variations of the resistance of the resistor 434 and the capacitance of the capacitor 438 can be compensated. However, the variations of $T_S$ will impact the power module on its EMI performance, efficiency performance, and its transformer selection. Although the mentioned problems can be tackled by trimming the resistance of the resistor 434 and the capacitance of the capacitor 438 in each power module, however, it will incur manufacturing cost and excess manufacturing procedures.

To solve the foregoing problems, a novel constant current controller is needed.

SUMMARY OF THE INVENTION

One objective of the present invention is to disclose a constant current controller, which is capable of generating a required average of a secondary side current independent of the switching frequency of a constant current power module.

Another objective of the present invention is to disclose a constant current controller, which is capable of generating a required average of a secondary side current by setting the resistance of a resistor outside the constant current controller.

Still another objective of the present invention is to disclose a constant current controller, which is capable of reducing the variations of a required average of a secondary side current by using a ratio of two resistances inside the constant current controller in generating the required average of a secondary side current.

To attain the foregoing objectives, a constant current controller for a constant current power module is proposed, the constant current controller including:

a demagnetization sensing unit, used for detecting the voltage variation of a detection signal to generate a discharging time signal, wherein the detection signal is derived from an auxiliary coil, and the discharging time signal has an active period corresponding to a secondary side discharging time;

a secondary side current sensing unit, used for detecting a peak value of a current sensing signal, and providing an output current according to the peak value of the current sensing signal under the control of the discharging time signal, wherein the current sensing signal is corresponding to a primary side current; and an error current generator, used for generating an error current according to the difference between the output current and a reference current, wherein the error current is converted to a threshold voltage by a first capacitor.

Preferably, the constant current controller further includes a set/reset generator for generating a set signal and a reset signal, and the set/reset generator uses the threshold voltage to determine an active time point of the reset signal.

Preferably, the constant current controller further includes a latch and a driver for generating a gate signal according to the set signal and the reset signal, and the gate signal becomes active when the set signal is active, and the gate signal becomes inactive when the reset signal is active.

In one embodiment, the secondary side current sensing unit includes:

a sample-and-hold unit, used to hold a sampled voltage representing a peak value of the current sensing signal in one switching cycle;

a first amplifier, having a first positive input, a first negative input, and a first output, the first positive input being coupled with the sampled voltage;

a first NMOS transistor, having a first gate, a first drain, and a first source, the first gate being coupled to the first output of the first amplifier, and the first source being coupled to the first negative input of the first amplifier;

a first resistor, coupled between the first source of the first NMOS transistor and a ground; and a switch, having a first end coupled to the first drain of the first NMOS transistor, a second end for providing the output current, and a control end controlled by the discharging time signal.

In one embodiment, the error current generator includes:

a second amplifier, having a second positive input, a second negative input, and a second output, the second positive input being coupled with a reference voltage;

a second NMOS transistor, having a second gate, a second drain, and a second source, the second gate being coupled to the second output of the second amplifier, and the second source being coupled to the second negative input of the second amplifier;

a second resistor, coupled between the second source of the second NMOS transistor and the ground;

a first PMOS transistor, having a third gate, a third drain, and a third source, the third source being coupled to a DC voltage, the third gate being coupled to the third drain, and the third drain being coupled to the second drain of the second NMOS transistor; and a second PMOS transistor, having a fourth gate, a fourth drain, and a fourth source, the fourth source being coupled to the DC voltage, the fourth gate being coupled to the third gate, and the fourth drain being coupled to the first capacitor and the second end of the switch.

In one embodiment, the secondary side current sensing unit comprises:

a sample-and-hold unit, used to hold a sampled voltage representing a peak value of the current sensing signal in one switching cycle;

a first amplifier, having a first positive input, a first negative input, and a first output, the first positive input being coupled with the sampled voltage;

an NMOS transistor, having a first gate, a first drain, and a first source, the first gate being coupled to the first output of the first amplifier, and the first source being coupled to the first negative input of the first amplifier;

a first resistor, coupled between the first source of the NMOS transistor and a ground;

a first PMOS transistor, having a second gate, a second drain, and a second source, the second source being coupled to a DC voltage, the second gate being coupled to the second drain, and the second drain being coupled to the first drain of the NMOS transistor; and a second PMOS transistor, having a third gate, a third drain, and a third source, the third source being coupled to the DC voltage, the third gate being coupled to the second gate; and a switch, having a first end coupled to the third drain of the second PMOS transistor, a second end for providing the output current, and a control end controlled by the discharging time signal.

In one embodiment, the error current generator includes:

a second amplifier, having a second positive input, a second negative input, and a second output, the second positive input being coupled with a reference voltage, the second negative input being coupled to the second end of the switch, and the second output being coupled to the first capacitor;

a second resistor, coupled between the second negative input of the second amplifier and the ground; and a second capacitor, coupled between the second negative input of the second amplifier and the ground.

To make it easier for our examiner to understand the objective of the invention, its structure, innovative features, and performance, we use preferred embodiments together with the accompanying drawings for the detailed description of the invention.

DETAILED DESCRIPTION OF THE PREFERRED EMBODIMENTS

The present invention will be described in more detail hereinafter with reference to the accompanying drawings that show the preferred embodiments of the invention.

Figure 1:
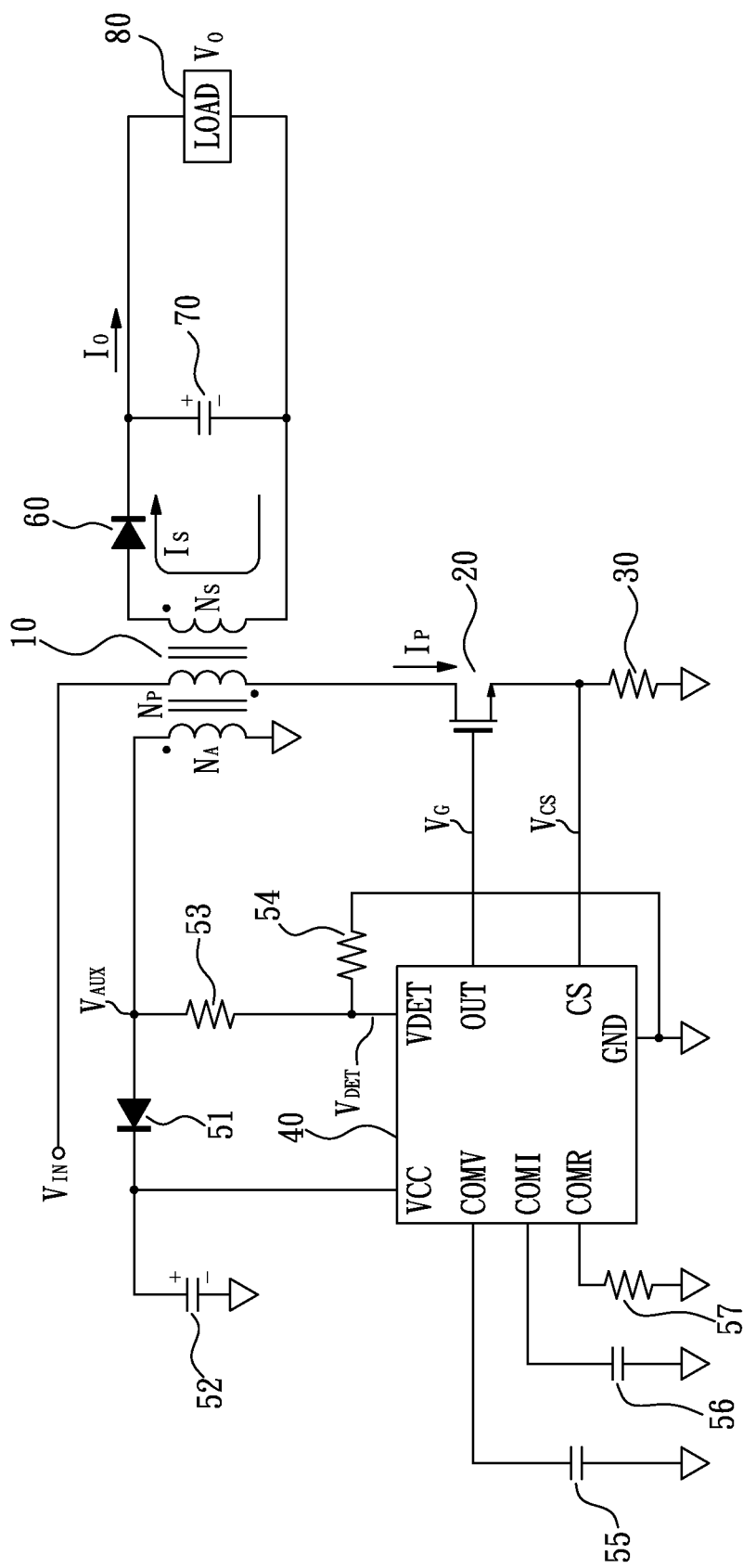
FIG. 1 illustrates a circuit diagram of a prior art constant current power module.
Figure 2:
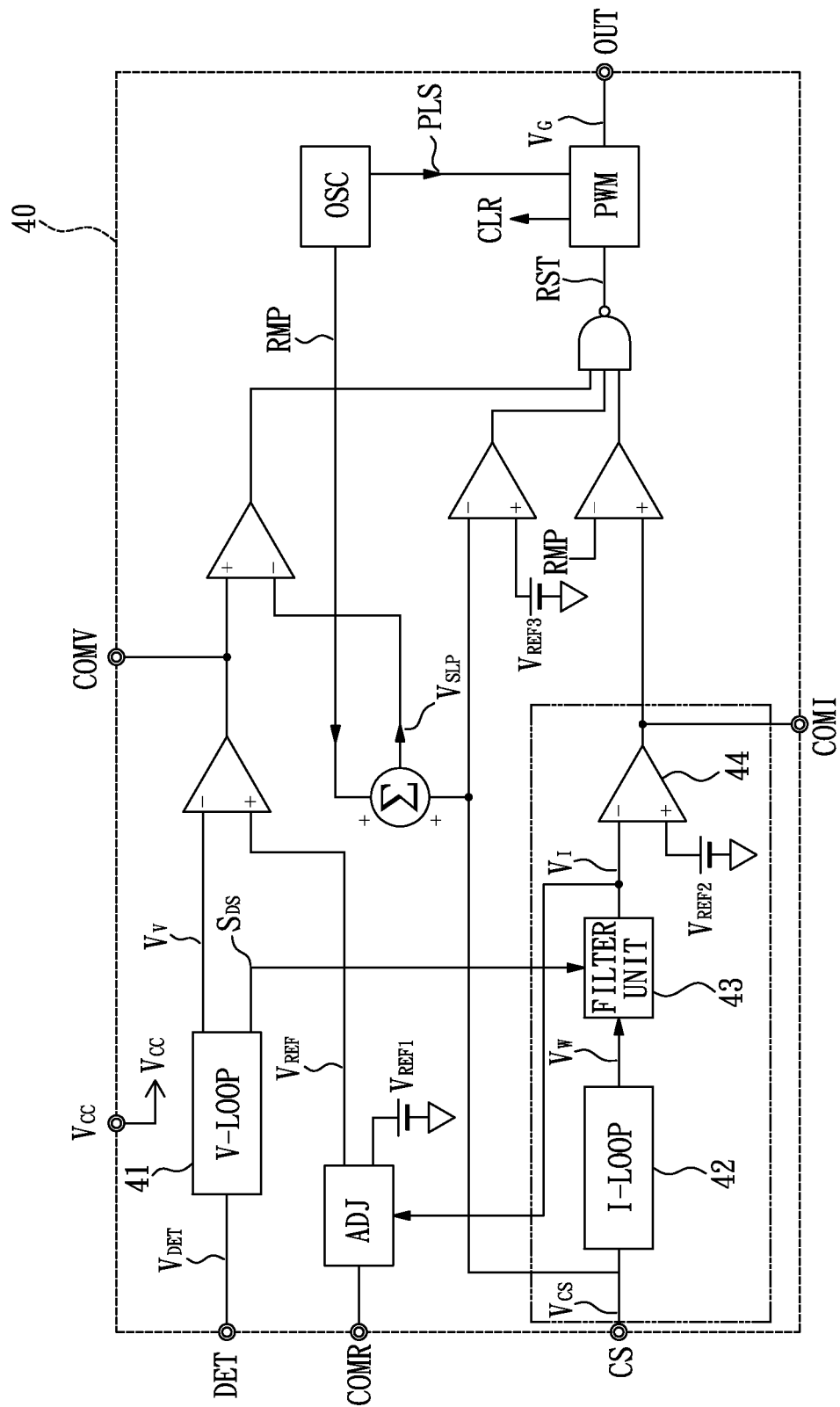
FIG. 2 illustrates a detailed function block diagram of the controller in FIG. 1.
Figure 3:
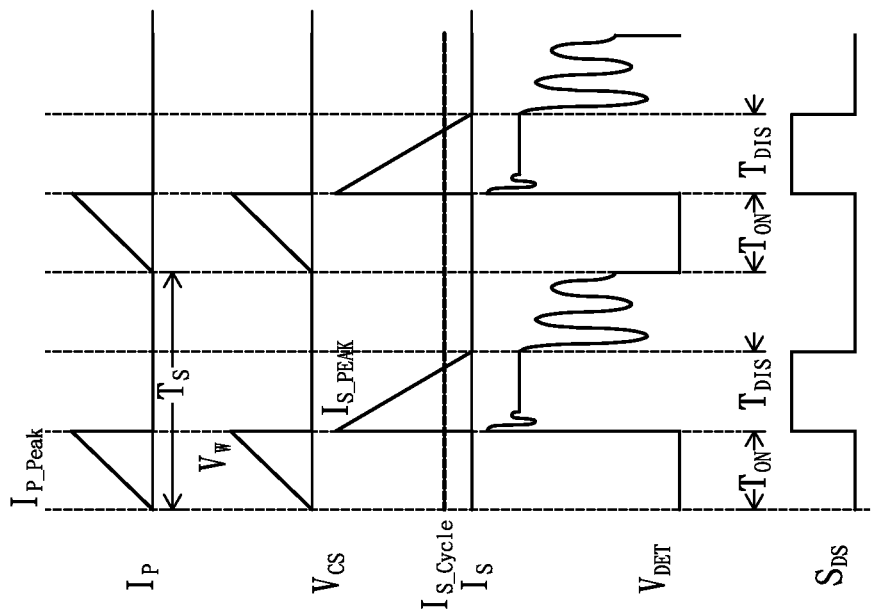
FIG. 3 illustrates a waveform diagram for major signals in FIG. 1 and FIG. 2.
Figure 4:
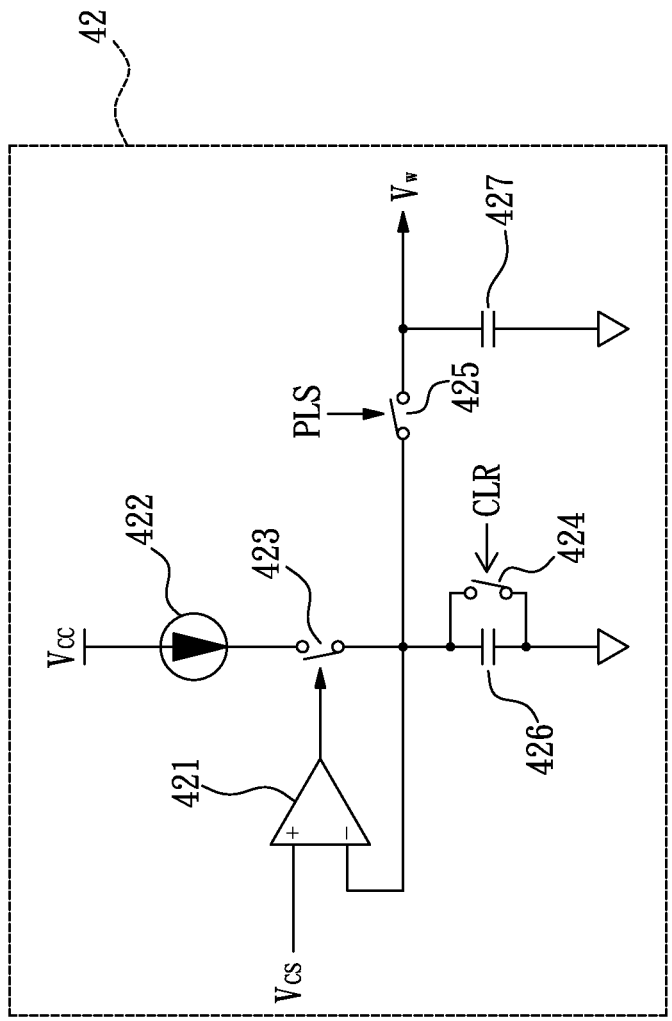
FIG. 4 illustrates a circuit diagram of the I-LOOP unit in FIG. 2.
Figure 5:
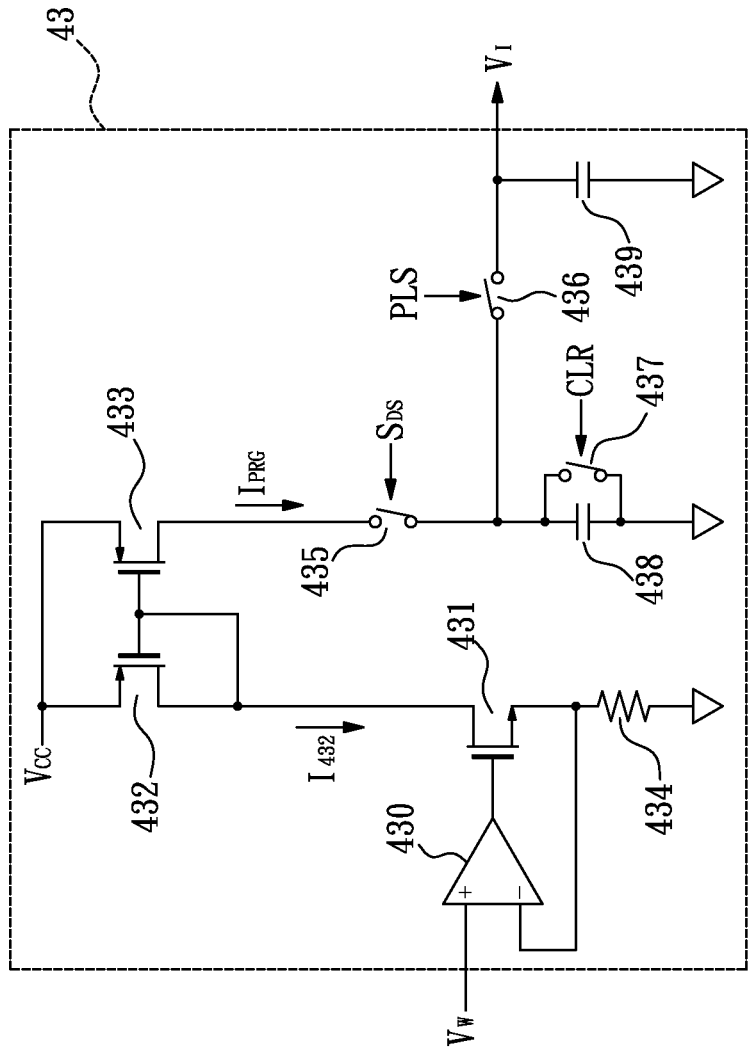
FIG. 5 illustrates a circuit diagram of the filter unit in FIG. 2.
Figure 6:
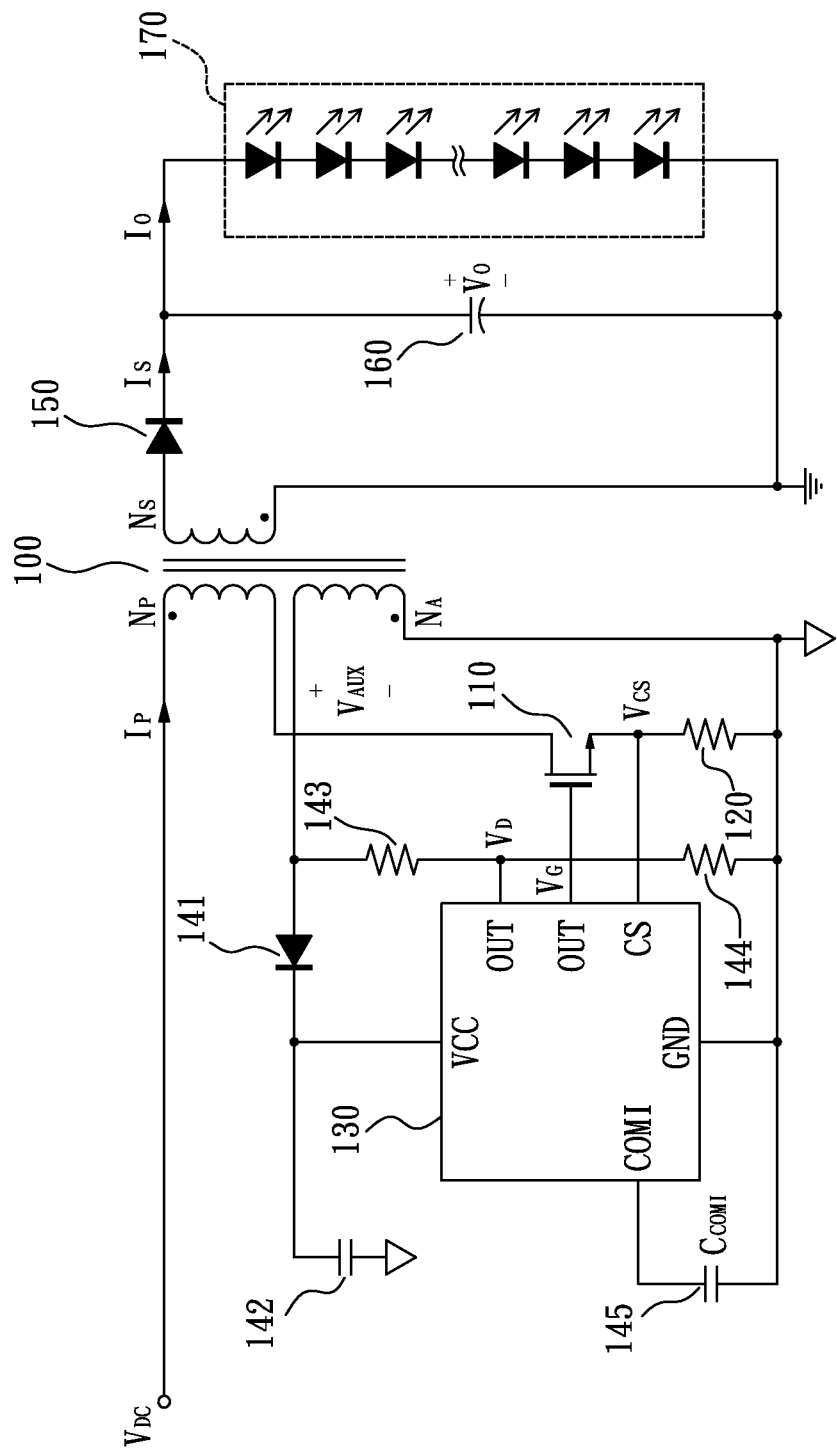
FIG. 6 illustrates a circuit diagram of a constant current power module including a constant current controller according to a preferred embodiment of the present invention.

Please refer to FIG. 6, which illustrates a circuit diagram of a constant current power module including a constant current controller according to a preferred embodiment of the present invention. As illustrated in FIG. 6, the constant current power module includes a transformer 100, an NMOS transistor 110, a resistor 120, a constant current controller 130, a diode 141, a capacitor 142, resistors 143-144, a capacitor 145, a diode 150, a capacitor 160, and a LED load 170.

The transformer 100 has a primary coil of $N_P$ turns, a secondary coil of $N_S$ turns, and an auxiliary coil of $N_A$ turns.

The NMOS transistor 110 is used for controlling a primary side current $I_P$ flowing through the primary coil according to a duty ratio of a gate signal $V_G$.

The resistor 120, connected between the NMOS transistor 110 and a ground, is used for generating a current sensing signal $V_{CS}$ in response to the primary side current $I_P$ by $V_{CS}=I_P \times R_S$, wherein $R_S$ is the resistance of the resistor 120.

The constant current controller 130 is used for generating the gate signal $V_G$ in response to the current sensing signal $V_{CS}$ and a detection signal $V_D$.

The diode 141 and the capacitor 142, connected between the auxiliary coil and the ground, are used to regulate an auxiliary signal $V_{AUX}$ from the auxiliary coil to generate a supply voltage for the controller 130.

The resistors 143, 144 are used to divide the voltage of the auxiliary signal $V_{AUX}$ to generate the detection signal $V_D$, which has a pulse duration representing a secondary side discharging time.

The capacitor 145, connected between a COMI pin of the controller 130 and the ground, is used for converting an error current to a threshold voltage.

The diode 150 is used for releasing the magnetic energy of the transformer 100 in a form of a secondary side current $I_S$ when the NMOS transistor 110 is off.

The capacitor 160 is used for filtering the secondary side current $I_S$ to provide a DC output current $I_O$ for the LED load 170.

Figure 7:
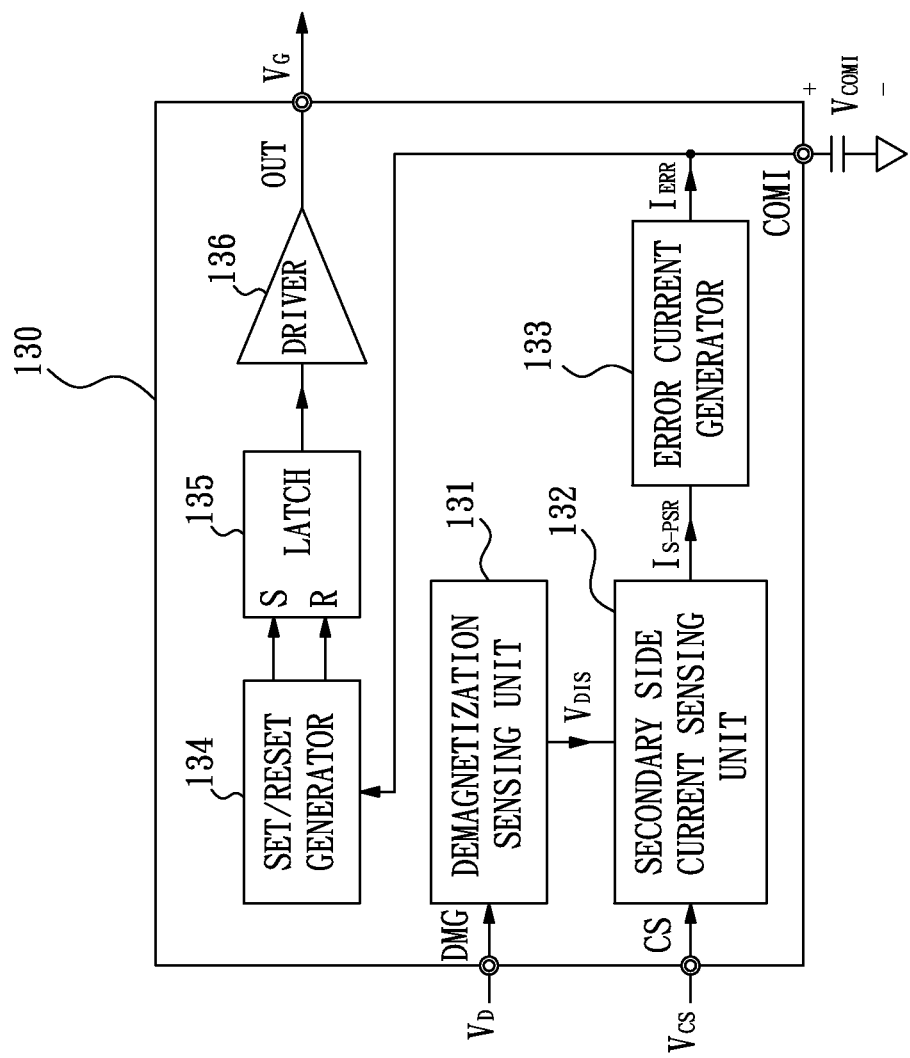
FIG. 7 illustrates a block diagram of a preferred embodiment of the constant current controller in FIG. 6.

A block diagram of a preferred embodiment of the constant current controller 130 is illustrated in FIG. 7. As illustrated in FIG. 7, the constant current controller 130 includes: a demagnetization unit 131, a secondary side current sensing unit 132, an error current generator 133, a SET/RESET generator 134, a latch 135, and a driver 136.

The demagnetization unit 131 is used for detecting the voltage variation of the detection signal $V_D$ to generate a discharging time signal $V_{DIS}$, which has an active period—a high-level period, for example—corresponding to the secondary side discharging time.

The secondary side current sensing unit 132 is used for detecting a peak value of the current sensing signal $V_{CS}$, and providing an output current $I_{S\text{-}PSR}$ according to the peak value of the current sensing signal $V_{CS}$ under the control of the discharging time signal $V_{DIS}$.

The error current generator 133 is used for generating an error current $I_{ERR}$ according to the difference between the output current $I_{S\text{-}PSR}$ and a reference current, and the error current $I_{ERR}$ is converted to a threshold voltage $V_{COMI}$ by the capacitor 145.

The set/reset generator 134 is used for generating a set signal and a reset signal to drive the latch 135. The set/reset generator 134 uses the threshold voltage $V_{COMI}$ to determine an active time point of the reset signal. For example, if the level of the threshold voltage $V_{COMI}$ shifts higher, the reset signal will become active at a later time point.

The latch 135 and the driver 136 are used to generate the gate signal $V_G$ according to the set signal and the reset signal. The gate signal $V_G$ becomes active when the set signal is active, and becomes inactive when the reset signal is active.

When in steady state, the average of the error current $I_{ERR}$ will approach zero and the average of the secondary side current $I_S$ per cycle will approach a constant value.

Figure 8:
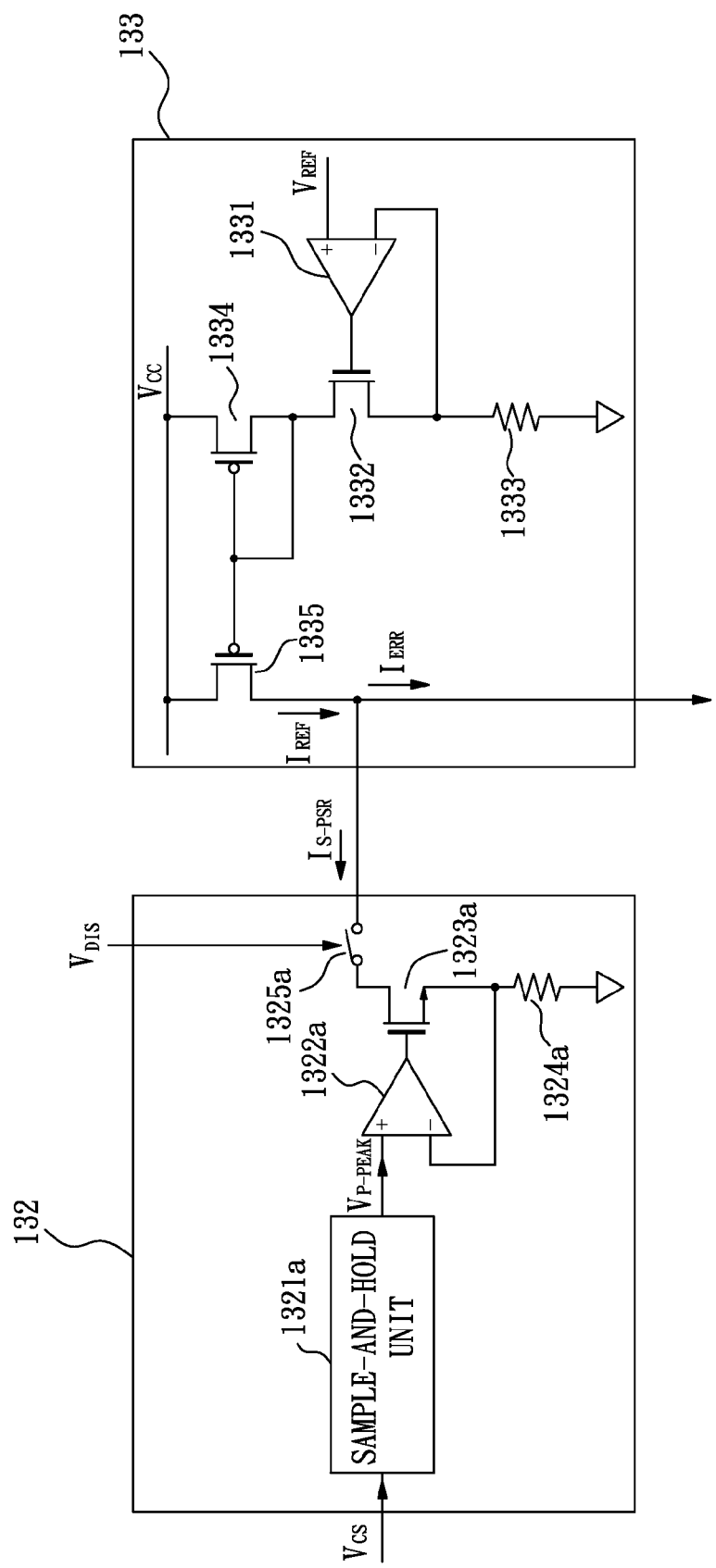
FIG. 8 illustrates a circuit diagram of a preferred embodiment of the secondary side current sensing unit and the error current generator in FIG. 7.

A circuit diagram of a preferred embodiment of the secondary side current sensing unit 132 and the error current generator 133 is illustrated in FIG. 8. As illustrated in FIG. 8, the secondary side current sensing unit 132 includes a sample-and-hold unit 1321a, an amplifier 1322a, an NMOS transistor 1323a, a resistor 1324a, and a switch 1325a. The error current generator 133 includes an amplifier 1331, an NMOS transistor 1332, a resistor 1333, and PMOS transistors 1334-1335.

The sample-and-hold unit 1321a is used to hold a sampled voltage $V_{P\_PEAK}$ representing the peak value of the current sensing signal $V_{CS}$.

The amplifier 1322a has a positive input coupled with $V_{P\_PEAK}$, a negative input coupled to the resistor 1324a, and an output coupled to the NMOS transistor 1323a. Due to a virtual short effect, the voltage at the negative input will approach $V_{P\_PEAK}$.

The NMOS transistor 1323a, having a gate coupled to the amplifier 1322a, a drain coupled to the switch 1325a, and a source coupled to the resistor 1324a, is used to provide a high output impedance.

The resistor 1324a, coupled between the NMOS transistor 1323a and the ground, is used in determining the output current $I_{S\text{-}PSR}$.

The switch 1325a has one end coupled to the drain of the NMOS transistor 1323a, another end for providing $I_{S\text{-}PSR}$, and a control end controlled by the discharging time signal $V_{DIS}$ to let $I_{S\text{-}PSR}$ flow for a secondary side discharging time.

The amplifier 1331 has a positive input coupled with a reference voltage $V_{REF}$, a negative input coupled to the resistor 1333, and an output coupled to the NMOS transistor 1332. Due to a virtual short effect, the voltage at the negative input will approach $V_{REF}$.

The NMOS transistor 1332, having a gate coupled to the amplifier 1331, a drain coupled to the PMOS transistor 1334, and a source coupled to the amplifier 1331 and the resistor 1333, is used to provide a high output impedance.

The resistor 1333, coupled between the NMOS transistor 1332 and the ground, is used in determining a reference current $I_{REF}$.

The PMOS transistors 1334-1335 are used as a current mirror, and the PMOS transistor 1335 has a drain coupled to the switch 1325a and the capacitor 145 for generating the error current $I_{ERR}$, which is equal to $(I_{REF}-I_{S\_PSR})$.

When in operation, the sampled voltage $V_{P\_PEAK}$ representing a peak value of the primary side current $I_P$ is latched by the sample-and-hold unit 1321a. $V_{P\_PEAK}$ is then transformed to the output current $I_{S\_PSR}$ which is equal to $(V_{P\_PEAK}/R_1)$ when the switch 1325a turns on and is equal to 0 when the switch 1325a turns off, wherein $R_1$ is the resistance of the resistor 1324a. The output current $I_{S\_PSR}$ will discharge the capacitor 145 for a time $T_{DIS}$ controlled by the discharging time signal $V_{DIS}$, wherein $T_{DIS}$ is the high level period of the discharging time signal $V_{DIS}$. As a result, the charge drawn out by the output current $I_{S\_PSR}$ in a cycle $T_S$ will be equal to $(V_{P\_PEAK}/R_1) \times T_{DIS}$.

Besides, the reference current $I_{REF}$, equal to $(V_{REF}/R_2)$, is used to charge the capacitor 145, wherein $R_2$ is the resistance of the resistor 1333. When in a steady state, the charge drawn out by $I_{S\_PSR}$ will be equal to the charge carried in by $I_{REF}$ per cycle, that is, $(V_{P\_PEAK}/R_1) \times T_{DIS} = I_{REF} \times T_S = (V_{REF}/R_2) \times T_S$.

In addition, as the peak value of the secondary side current $I_S$ is equal to $(N_P/N_S) \times (V_{P\_PEAK}/R_S)$, wherein $V_{P\_PEAK}/R_S$ is the peak value of the primary side current $I_P$, the average of the secondary side current $I_S$ per cycle can be expressed as:

$$I_{S\_Cycle}=(N_P/N_S)\times(V_{P\_PEAK}/R_S)\times(T_{DIS}/2T_S)=(N_P/N_S)\times(R_1/R_2)\times(V_{REF}\times T_S)/(2\times R_S\times T_S)=(N_P/N_S)\times(R_1/R_2)\times(V_{REF}/(2\times R_S)).$$

As can be seen in the formula above, $T_S$ is canceled out, and $I_{S\_Cycle}$ can be determined by $R_S$—the resistance of the resistor 120 outside the constant current controller 130—with $(N_P/N_S)$, $(R_1/R_2)$, and $V_{REF}$ being fixed. Besides, as $R_1$, $R_2$ are inside the constant current controller 130, the variations of the resistance ratio $(R_1/R_2)$ can be quite small.

Figure 9:
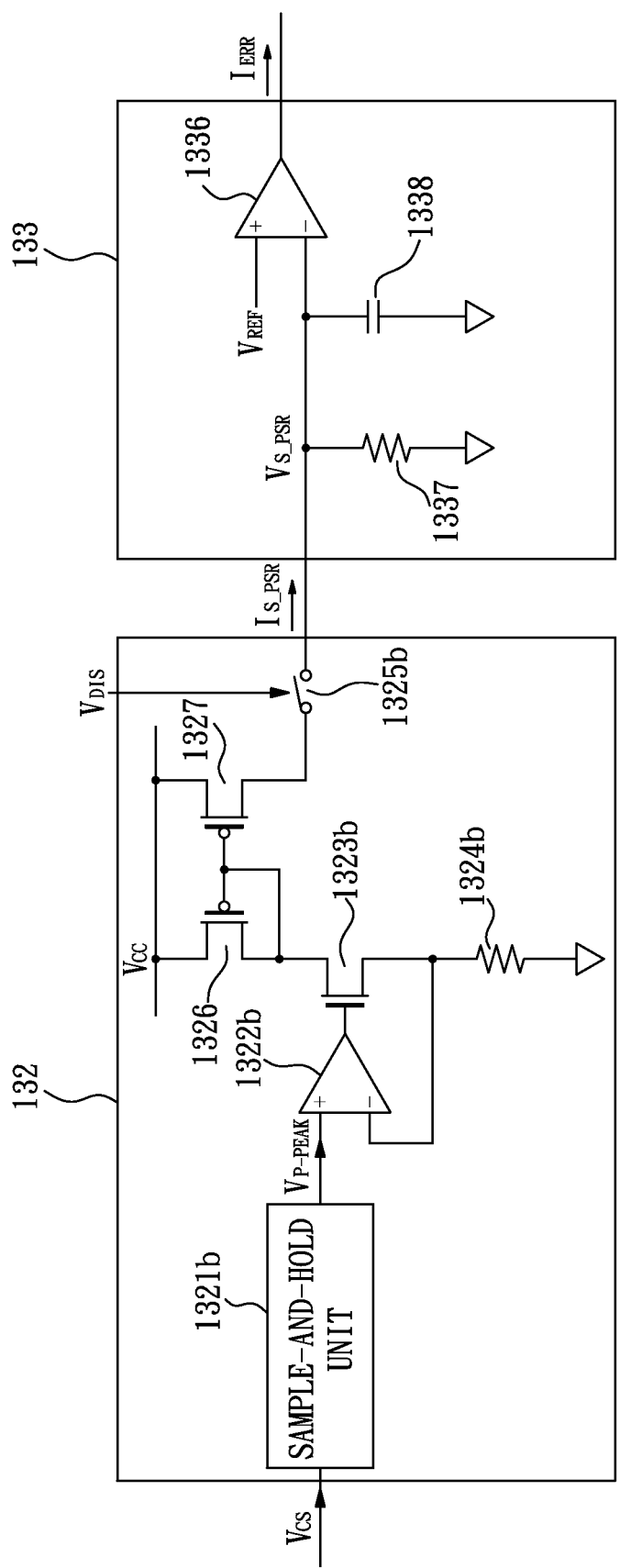
FIG. 9 illustrates a circuit diagram of another preferred embodiment of the secondary side current sensing unit and the error current generator in FIG. 7.

A circuit diagram of another preferred embodiment of the secondary side current sensing unit 132 and the error current generator 133 is illustrated in FIG. 9. As illustrated in FIG. 9, the secondary side current sensing unit 132 includes a sample-and-hold unit 1321b, an amplifier 1322b, an NMOS transistor 1323b, a resistor 1324b, PMOS transistors 1326-1327, and a switch 1325b. The error current generator 133 includes a trans-conductance amplifier 1336, a resistor 1337, and a capacitor 1338.

The sample-and-hold unit 1321b is used to hold a sampled voltage $V_{P\_PEAK}$ representing the peak value of the current sensing signal $V_{CS}$.

The amplifier 1322b has a positive input coupled to $V_{P\_PEAK}$, a negative input coupled to the resistor 1324b, and an output coupled to the NMOS transistor 1323b. Due to a virtual short effect, the voltage at the negative input will approach $V_{P\_PEAK}$.

The NMOS transistor 1323b, having a gate coupled to the amplifier 1322b, a drain coupled the PMOS transistor 1326, and a source coupled to the resistor 1324b, is used to provide a high output impedance.

The resistor 1324b, coupled between the NMOS transistor 1323b and the ground, is used in determining a current equal to $V_{P\_PEAK}/R_3$, wherein $R_3$ is the resistance of the resistor 1324b.

The PMOS transistors 1326-1327 are used as a current mirror, and the PMOS transistor 1327 has a drain coupled to the switch 1325b for providing a duplicated current of $(V_{P\_PEAK}/R_3)$.

The switch 1325b, coupled to the PMOS transistor 1327, is controlled by the discharging time signal $V_{DIS}$ to provide an output current $I_{S\text{-}PSR}$, wherein $I_{S\text{-}PSR}$ is equal to the duplicated current of $(V_{P\_PEAK}/R_3)$ when $V_{DIS}$ is at a high level, and equal to zero when $V_{DIS}$ is at a low level.

The trans-conductance amplifier 1336 has a positive input coupled to a reference voltage $V_{REF}$, a negative input coupled to the resistor 1337 and the capacitor 1338, and an output coupled to the capacitor 145 for providing the error current $I_{ERR}$.

The resistor 1337, having one end coupled to the switch 1325b, the capacitor 1338, and the trans-conductance amplifier 1336, and another end coupled to the ground, is used to define $I_{REF}$ by $I_{REF}=V_{REF}/R_4$, wherein $R_4$ is the resistance of the resistor 1337.

The capacitor 1338, having one end coupled to the negative input of the trans-conductance amplifier 1336, and another end coupled to the ground, is used to limit the swing of $V_{S\text{-}PSR}$ to be within a linear region of the trans-conductance amplifier 1336.

When in a steady state, the average of $V_{S\text{-}PSR}$ will be equal to $V_{REF}$, that is, $(V_{P\_PEAK}/R_3)\times R_4\times T_{DIS}/T_S=V_{REF}$, wherein $T_{DIS}$ is a high level period of the discharging time signal $V_{DIS}$, and $T_S$ is a cycle time; and the average of the output current $I_{S\text{-}PSR}=(V_{P\_PEAK}/R_3)\times T_{DIS}/T_S$ will be equal to $V_{REF}/R_4$, which is an implied reference current.

In addition, as the peak value of the secondary side current $I_S$ is equal to $(N_P/N_S)\times(V_{P\_PEAK}/R_S)$, wherein $V_{P\_PEAK}/R_S$ is the peak value of the primary side current $I_P$, the average of the secondary side current $I_S$ per cycle can be expressed as:

$$I_{S\_cycle}=(N_P/N_S)\times(V_{P\_PEAK}/R_S)\times(T_{DIS}/2T_S)=(N_P/N_S)\times(R_3/R_4)\times(V_{REF})/(2\times R_S).$$

As can be seen in the formula above, $T_S$ is canceled out, and $I_{S\_cycle}$ can be determined by $R_S$—the resistance of the resistor 120 outside the constant current controller 130—with $(N_P/N_S)$, $(R_3/R_4)$, and $V_{REF}$ being fixed. Besides, as $R_3$, $R_4$ are inside the constant current controller 130, the variations of the resistance ratio $(R_3/R_4)$ can be quite small.

In conclusion, the present invention possesses the advantages as follows:

First, the present invention can generate a required average of a secondary side current independent of the switching frequency of a constant current power module.

Second, the present invention can generate a required average of a secondary side current by setting the resistance of a resistor outside the constant current controller.

Third, the circuit architecture of the present invention can reduce the variations of a required average of a secondary side current by using a ratio of two resistances inside the constant current controller of the present invention in generating the required average of a secondary side current.

While the invention has been described by way of example and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. A constant current controller for a constant current power module, comprising:
   a demagnetization sensing unit, used for detecting the voltage variation of a detection signal to generate a discharging time signal, wherein said detection signal is derived from an auxiliary coil, and said discharging time signal has an active period corresponding to a secondary side discharging time;
   a secondary side current sensing unit, used for detecting a peak value of a current sensing signal, and providing an output current according to said peak value of said current sensing signal under the control of said discharging time signal, wherein said current sensing signal is corresponding to a primary side current; and
   an error current generator, used for generating an error current according to the difference between said output current and a reference current, wherein said error current is converted to a threshold voltage by a first capacitor.

2. The constant current controller as disclosed in claim 1, further comprising a set/reset generator for generating a set signal and a reset signal, wherein said set/reset generator uses said threshold voltage to determine an active time point of said reset signal.

3. The constant current controller as claim 2, further comprising a latch and a driver for generating a gate signal according to said set signal and said reset signal, wherein said gate signal becomes active when said set signal is active, and said gate signal becomes inactive when said reset signal is active.

4. The constant current controller as claim 3, wherein said secondary side current sensing unit comprises:
   a sample-and-hold unit, used to hold a sampled voltage representing a peak value of said current sensing signal;
   a first amplifier, having a first positive input, a first negative input, and a first output, said first positive input being coupled with said sampled voltage;
   a first NMOS transistor, having a first gate, a first drain, and a first source, said first gate being coupled to said first output of said first amplifier, and said first source being coupled to said first negative input of said first amplifier;
   a first resistor, coupled between said first source of said first NMOS transistor and a ground; and
   a switch, having a first end coupled to said first drain of said first NMOS transistor, a second end for providing said output current, and a control end controlled by said discharging time signal.

5. The constant current controller as disclosed in claim 4, wherein said error current generator comprises:
   a second amplifier, having a second positive input, a second negative input, and a second output, said second positive input being coupled with a reference voltage;
   a second NMOS transistor, having a second gate, a second drain, and a second source, said second gate being coupled to said second output of said second amplifier, and said second source being coupled to said second negative input of said second amplifier;
   a second resistor, coupled between said second source of said second NMOS transistor and said ground;
   a first PMOS transistor, having a third gate, a third drain, and a third source, said third source being coupled to a DC voltage, said third gate being coupled to said third drain, and said third drain being coupled to said second drain of said second NMOS transistor; and
   a second PMOS transistor, having a fourth gate, a fourth drain, and a fourth source, said fourth source being coupled to said DC voltage, said fourth gate being coupled to said third gate, and said fourth drain being coupled to said first capacitor and said second end of said switch.

6. The constant current controller as claim 3, wherein said secondary side current sensing unit comprises:
   a sample-and-hold unit, used to hold a sampled voltage representing a peak value of said current sensing signal;
   a first amplifier, having a first positive input, a first negative input, and a first output, said first positive input being coupled with said sampled voltage;
   an NMOS transistor, having a first gate, a first drain, and a first source, said first gate being coupled to said first output of said first amplifier, and said first source being coupled to said first negative input of said first amplifier;
   a first resistor, coupled between said first source of said NMOS transistor and a ground;
   a first PMOS transistor, having a second gate, a second drain, and a second source, said second source being coupled to a DC voltage, said second gate being coupled to said second drain, and said second drain being coupled to said first drain of said NMOS transistor; and
   a second PMOS transistor, having a third gate, a third drain, and a third source, said third source being coupled to said DC voltage, said third gate being coupled to said second gate; and
   a switch, having a first end coupled to said third drain of said second PMOS transistor, a second end for providing said output current, and a control end controlled by said discharging time signal.

7. The constant current controller as disclosed in claim 6, wherein said error current generator comprises:
   a second amplifier, having a second positive input, a second negative input, and a second output, said second positive input being coupled with a reference voltage, said second negative input being coupled to said second end of said switch, and said second output being coupled to said first capacitor;
   a second resistor, coupled between said second negative input of said second amplifier and said ground; and
   a second capacitor, coupled between said second negative input of said second amplifier and said ground.

8. A constant current controller for a constant current power module, comprising:
- a sample-and-hold unit, used to hold a sampled voltage representing a peak value of a current sensing signal, said current sensing signal representing a primary side current;
- a first amplifier, having a first positive input, a first negative input, and a first output, said first positive input being coupled with said sampled voltage;
- a first NMOS transistor, having a first gate, a first drain, and a first source, said first gate being coupled to said first output of said first amplifier, and said first source being coupled to said first negative input of said first amplifier;
- a first resistor, coupled between said first source of said first NMOS transistor and a ground;
- a switch, having a first end coupled to said first drain of said first NMOS transistor, a second end for providing an output current, and a control end controlled by a discharging time signal having an active period corresponding to a secondary side discharging time;
- a second amplifier, having a second positive input, a second negative input, and a second output, said second positive input being coupled with a reference voltage;
- a second NMOS transistor, having a second gate, a second drain, and a second source, said second gate being coupled to said second output of said second amplifier, and said second source being coupled to said second negative input of said second amplifier;
- a second resistor, coupled between said second source of said second NMOS transistor and said ground;
- a first PMOS transistor, having a third gate, a third drain, and a third source, said third source being coupled to a DC voltage, said third gate being coupled to said third drain, and said third drain being coupled to said second drain of said second NMOS transistor; and
- a second PMOS transistor, having a fourth gate, a fourth drain, and a fourth source, said fourth source being coupled to said DC voltage, said fourth gate being coupled to said third gate, and said fourth drain being coupled to an external capacitor and said second end of said switch.

9. A constant current controller for a constant current power module, comprising:
- a sample-and-hold unit, used to hold a sampled voltage representing a peak value of a current sensing signal, said current sensing signal representing a primary side current;
- a first amplifier, having a first positive input, a first negative input, and a first output, said first positive input being coupled with said sampled voltage;
- an NMOS transistor, having a first gate, a first drain, and a first source, said first gate being coupled to said first output of said first amplifier, and said first source being coupled to said first negative input of said first amplifier;
- a first resistor, coupled between said first source of said NMOS transistor and a ground;
- a first PMOS transistor, having a second gate, a second drain, and a second source, said second source being coupled to a DC voltage, said second gate being coupled to said second drain, and said second drain being coupled to said first drain of said NMOS transistor; and
- a second PMOS transistor, having a third gate, a third drain, and a third source, said third source being coupled to said DC voltage, said third gate being coupled to said second gate;
- a switch, having a first end coupled to said third drain of said second PMOS transistor, a second end for providing an output current, and a control end controlled by a discharging time signal having an active period corresponding to a secondary side discharging time;
- a second amplifier, having a second positive input, a second negative input, and a second output, said second positive input being coupled with a reference voltage, said second negative input being coupled to said second end of said switch, and said second output being coupled to an external capacitor;
- a second resistor, coupled between said second negative input of said second amplifier and said ground; and
- a second capacitor, coupled between said second negative input of said second amplifier and said ground.

* * * * *